(12) United States Patent
Crump

(10) Patent No.: US 11,691,257 B2
(45) Date of Patent: Jul. 4, 2023

(54) END CAP REMOVAL DEVICE FOR A CENTRAL WATER PLANT

(71) Applicant: Jock J. Crump, Belfast, TN (US)

(72) Inventor: Jock J. Crump, Belfast, TN (US)

(*) Notice: Subject to any disclaimer, the term of this patent is extended or adjusted under 35 U.S.C. 154(b) by 15 days.

(21) Appl. No.: 17/409,102

(22) Filed: Aug. 23, 2021

(65) Prior Publication Data

US 2022/0063069 A1    Mar. 3, 2022

Related U.S. Application Data

(60) Provisional application No. 63/070,967, filed on Aug. 27, 2020.

(51) Int. Cl.
*B25B 27/02* (2006.01)
*B01D 61/10* (2006.01)

(52) U.S. Cl.
CPC ............ *B25B 27/023* (2013.01); *B01D 61/10* (2013.01); *B01D 2313/21* (2013.01)

(58) Field of Classification Search
CPC .. B25B 27/023; B01D 61/10; B01D 2313/21; B01D 2313/56; F16J 13/10; E02D 29/1445
USPC .............................. 29/244, 700, 250; 81/3.07
See application file for complete search history.

(56) References Cited

U.S. PATENT DOCUMENTS

| | | | | |
|---|---|---|---|---|
| 162,147 A | * | 4/1875 | Bostwick ................. | B30B 1/18 100/230 |
| 499,747 A | * | 6/1893 | Moe ........................ | F23L 13/02 126/292 |
| 1,336,291 A | * | 4/1920 | Gilmore ................ | B25B 31/005 29/238 |
| 1,510,291 A | * | 9/1924 | Alexander ............ | B25B 27/023 29/263 |
| 1,638,789 A | * | 8/1927 | Weaver ................. | B23D 37/04 29/270 |
| 2,519,572 A | * | 8/1950 | Hill .......................... | F16J 13/02 220/259.4 |
| 2010/0112815 A1 | * | 5/2010 | O'Dougherty .......... | B67D 7/34 438/758 |

* cited by examiner

*Primary Examiner* — Lawrence Averick
(74) *Attorney, Agent, or Firm* — Tod A. Kupstas

(57) ABSTRACT

A cap removal device is adapted to remove end caps from water pump devices. The cap removal device has a cap remover that is adapted to be secured to the end caps of pressure vessels. The cap removal device further has a honed tube that is adapted to stabilize the cap removal device and the end cap during removal of the end cap thereby preventing cross-threading. The cap removal device also has a puller handle that is adapted to make removal of the end cap more efficient.

13 Claims, 4 Drawing Sheets

END CAP REMOVAL DEVICE FOR A CENTRAL WATER PLANT

This application claims the benefit of U.S. patent No. 63/070,967 filed Aug. 27, 2020, the contents of which are incorporated herein by reference.

BACKGROUND

1. Field

This application is directed to the field of reverse osmosis equipment. In particular, the application is directed to an apparatus for removing the end cap from a fiberglass or metal vessel.

2. Description of the Related Art

Reverse osmosis is a water purification process that in some instances uses membranes and other equipment to remove impurities from water. Certain types of reverse osmosis equipment have caps that need to be removed during membrane replacement. For example, vessels on reverse osmosis equipment have end caps that occasionally need to be removed. A problem encountered when removing these end caps is that slippage can occur when using a puller that can result in cross-threading of the end cap puller rod. Cross-threading is when the threads of the end cap puller rod shifts and thus the threads can cut into each other, thereby damaging the end cap and the puller rod.

Because of the occurrence of slippage and the possibility of cross-threading during end cap removal on reverse osmosis equipment, it is desirable to develop a manner to prevent slippage when the caps are removed to prevent damage to the puller rod and/or end cap and improve overall efficiency.

SUMMARY

Briefly described, aspects of the present disclosure relate to devices adapted for removing caps from the components of reverse osmosis systems.

An aspect of the present disclosure is a device for removing end caps from a vessel. The device comprising: a cap remover adapted to be secured to an end cap of the vessel; a honed tube adapted to be secured to the end cap and to stabilize the device when removing the end cap from the vessel, wherein the honed tube has a larger diameter than the cap remover; and a puller handle adapted to be secured to the cap remover, wherein movement of the puller handle removes the end cap from the vessel.

Another aspect of the present disclosure is a cap removal device for removing end caps from a reverse osmosis pressure vessel. The device comprising: a cap remover adapted to be secured to an end cap of a reverse osmosis pressure vessel; a honed tube adapted to be secured to the end cap and adapted to stabilize the cap removal device when removing the end cap from reverse osmosis pressure vessel, wherein the honed tube has a larger circumference than the cap remover; and a puller handle adapted to be secured to the cap remover, wherein movement of the puller handle removes the end cap from the reverse osmosis pressure vessel.

Still yet another aspect of the present disclosure is a method of removing an end cap from a reverse osmosis pressure device. The method comprising: securing a cap remover to the end cap of the reverse osmosis pressure vessel; securing a honed tube to the cap remover and the end cap of the pressure vessel; stabilizing the cap remover with the honed tube; securing the puller handle to the cap remover; and removing the end cap from the reverse osmosis pressure vessel via movement of the puller handle.

DETAILED DESCRIPTION

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art.

The components described hereinafter as making up the various embodiments are intended to be illustrative and not restrictive. Many suitable components that would perform the same or a similar function as the components described herein are intended to be embraced within the scope of embodiments of the present disclosure.

The cap removal device disclosed herein is adapted for use with reverse osmosis equipment. In particular, the cap removal device is adapted to remove the end caps off the pressure vessels used in reverse osmosis equipment implemented in water plants. While the cap removal device is discussed as being used with pressure vessels used in water plant reverse osmosis equipment, the cap removal device may be used with other reverse osmosis equipment that can benefit from the avoidance of puller slippage in the removal of caps. Furthermore, the cap removal device can be adapted to the dimensions of different pressure vessels as well as the dimensions of different caps for different components of a water pump system.

The cap removal device is adapted to engage the end cap of components of the reverse osmosis equipment and avoid puller slippage when the puller is engaged with the end cap of a vessel. By avoiding puller slippage, cross threading problems with the end cap and puller can be avoided when removing the end caps. Additionally, removal of the end cap is made easier by the design disclosed herein. Furthermore, the end cap removal device disclosed herein can increase the efficiency of changing end caps for the reverse osmosis equipment vessel.

Figure 1:
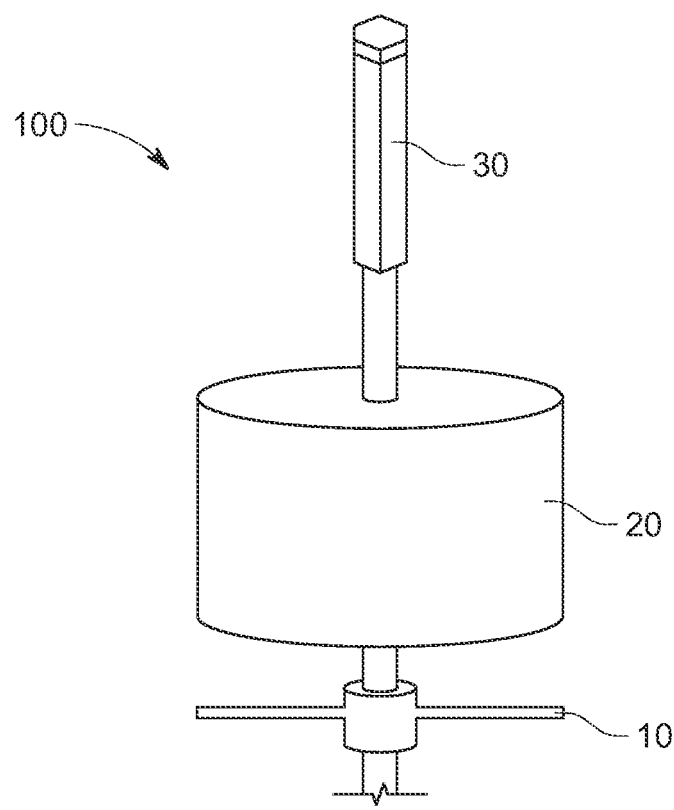
FIG. 1 is a view of a cap removal device for a reverse osmosis equipment vessel.

Referring now to FIG. 1, a cap removal device 100 is shown in an extended position. The cap removal device 100 comprises a cap remover 10, a honed tube 20 and a puller handle 30. The cap removal device 100 is adapted to provide over 50% more support during removal of an end cap and also to provide additional support in preventing and reducing cross threading.

In an embodiment, the cap remover 10 is made of a lightweight material. In an embodiment, the cap remover 10 is made of a durable material. In an embodiment, the cap remover 10 is made of steel. In an embodiment, the cap remover 10 is made of a ceramic material. In an embodiment, the cap remover 10 is made of a blended alloy. In an embodiment, the cap remover 10 is made of plastic material. In an embodiment, the cap remover 10 is made of metallic material. In an embodiment, the cap remover 10 is made of an organic material. In the event of damage, replacement cap removers may be kept readily available.

The honed tube 20 is adapted to provide 360 degrees of support when implementing the cap remover 10 on a component of the water pump system, for example the pressure vessel of a water pump system. The support facilitates avoidance of slippage of the cap removal device 100 during the removal of end caps and thus helps prevent cross threading.

The puller handle 30 is adapted to be used with hands or with a leverage type of tool (e.g., a wrench) to decrease the time needed in removing end caps for the water pump system components.

In an embodiment, the puller handle 30 has a hex shaped cross section so as be able to be used with an impact wrench to decrease the time needed to remove an end cap of a pressure vessel. In an embodiment, the puller handle is adapted to be a different shape that can be used with the pressure vessel. In an embodiment, the puller handle is circular in cross section. In an embodiment, the puller handle is square shape in cross section. In an embodiment, the puller handle is rectangular in cross section. In an embodiment, the puller handle is adapted to have a cross-section commensurate with a tool adapted to provide leverage in the removal of the end cap. In an embodiment, the puller handle has more than one section with each section having a different type of cross-section, wherein each section is able to be used with more than one type of tool. In an embodiment, the puller handle has an area that is adapted to conform to the grip of a hand.

The cap removal device 100 provides increased levels of support for a pressure vessel during end cap removal through use of the circular design of the honed tube 20 and the cap remover 10. The additional support paired with the puller handle 30 increases efficiency, decreases complications during pressure vessel end cap removal, and eliminates the need for additional tools or supplies previously used to apply support for pressure vessel membrane pullers on the market.

In operation, the cap remover 10 is screwed into the end cap of a vessel of the water plant by using screws (not shown). In an embodiment, self-tapping screws are used. The honed tube 20 is then positioned over the top of the vessel and its end cap. The puller handle 30 is placed through the honed tube 20 and then threaded down through the cap remover 10 and into the end cap of a vessel, for example the end cap of pressure vessel used with a reverse osmosis system of a water plant. As the puller handle 30 is threaded down through the cap remover 10, it extracts the end cap from the pressure vessel of the reverse osmosis system of the water plant.

Referring generally to FIGS. 1-8, cap remover 10 is screwed into the pressure vessel end cap to provide a base for extraction. In an embodiment, the cap remover is secured to the end cap via another method rather than screwing the cap remover to the end cap.

The honed tube 20 is placed over the cap remover 10 and the pressure vessel to provide stability and alignment for the extraction of the end cap from the pressure vessel. The puller handle 30 is threaded down through the honed tube 20 and the cap remover 10 to push the end cap of the pressure vessel up towards the cap removal device 100 and detach it from the pressure vessel.

Figure 2:
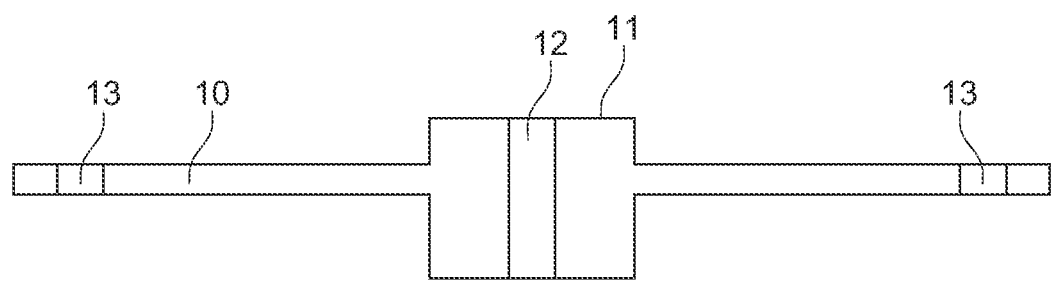
FIG. 2 is cross-sectional side view of the cap remover for the cap removal device.
Figure 3:
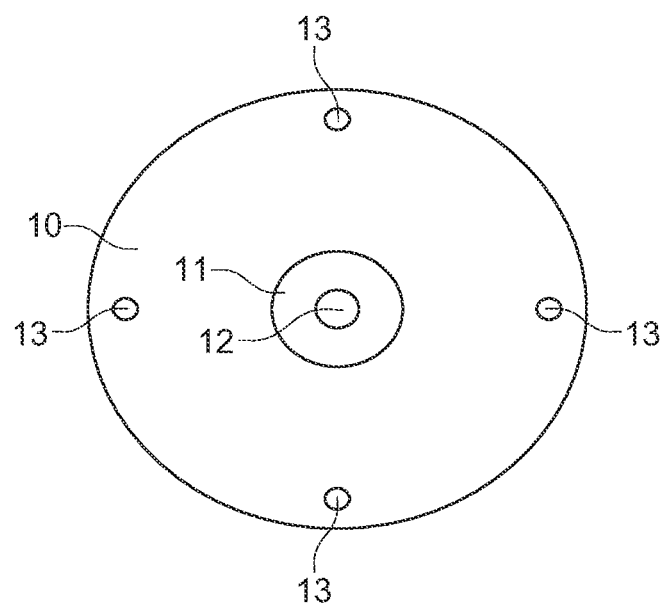
FIG. 3 is a top view of a cap remover for the cap removal device.

Referring to FIGS. 2 and 3, in an embodiment, the cap remover 10 may be lathed from a circular piece of 3-inch Polyoxymethylene (such as Delrin®). The cap remover 10 is a 3-inch diameter circle having a ¼-inch thickness. In an embodiment, the cap remover 10 has an integrated core 11 having a ¾-inch diameter with ¾-inch depth on the top portion of the cap remover 10, and ¼-inch depth on the bottom. In an embodiment, there is a 10 millimeter threaded hole 12 at the center of the core 11. The core 11 provides durability when the cap remover 10 is engaged with the puller handle 30.

It should be understood that while the cap remover 10 and its core 11 are described above having the aforementioned dimensions, the dimensions implemented in the cap remover 10 and the core 11 may vary depending on the nature of the end cap that is to be removed, i.e., larger end caps may implement cap removers and cores having different sizes, while smaller end caps may use smaller dimensioned cap removers and cores.

The cap remover 10 is formed as a disc having the core 11. Located between the core 11 and the perimeter of the cap remover are screw holes 13. In an embodiment, the screw holes 13 are 5/16-inch milled holes. In the embodiment shown in FIG. 3 the screw holes 13 are equidistantly spaced around the cap remover 10. In the embodiment shown, there are 4 screw holes 13 that are equidistantly spaced around the cap remover 10. It should be understood that while four equidistantly spaced screw holes are shown, more or less screw holes may be used with the cap remover 10. In an embodiment, the screw holes may be arranged in other arrangements, such as non-equidistantly spaced, or with holes placed at different distances from the circumference of the cap remover 10. The arrangement of screw holes 13 is adapted to provide secure attachment to an end cap.

Figure 4:
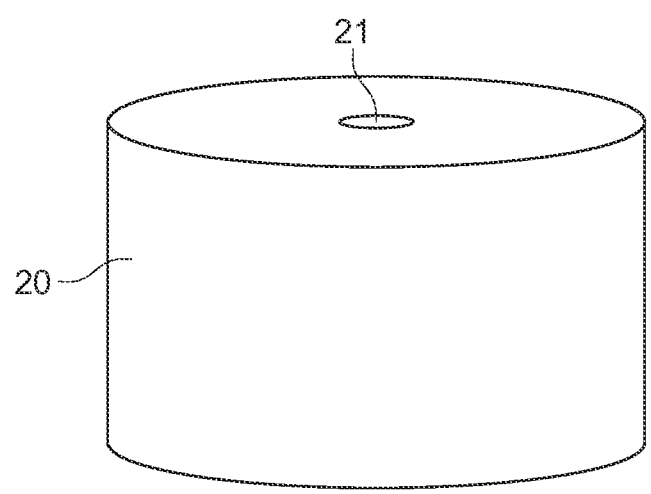
FIG. 4 is a view of the honed tube for the cap removal device.
Figure 5:
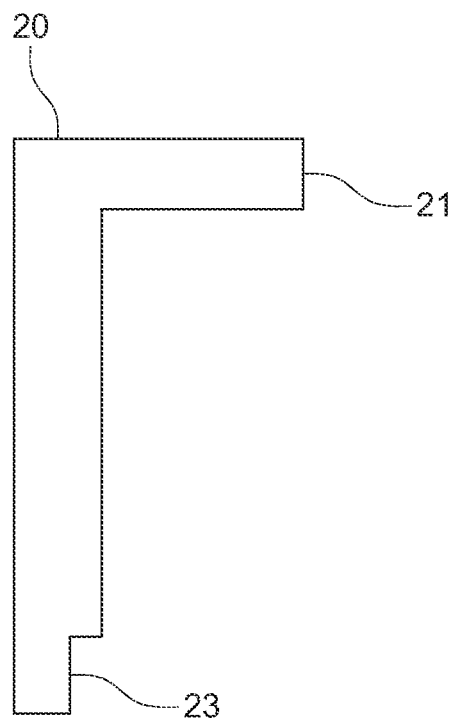
FIG. 5 is an inside side profile of the honed tube for the cap removal device.
Figure 6:
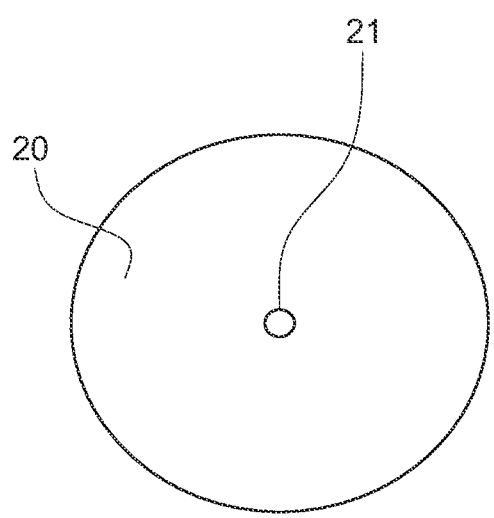
FIG. 6 is a top down view of the honed tube for the cap removal device.

Referring to FIGS. 4-6, the honed tube 20 is lathed from a piece of 4 and ½ inch by 3 and ½-inch, white Polyoxymethylene (Delrin®). The Delrin is lathed and hollowed out with a 4-inch diameter with a 3-inch depth and then lathed to a 4- and 3/16-inch diameter for the last ¼-inch. The top of the honed tube 20 is closed and has a ¼-inch depth and a 10 mm milled hole 21 at the center of the closed end. The bottom of the honed tube 20 is open and is adapted to fit over the cap remover 10 when the cap removal device 100 is implemented in removing end caps.

The bottom of the honed tube 20 having a 3/16-inch diameter for the last ¼-inch of the honed tube 20 creates inset area 23 that is adapted to secure the honed tube 20 to an end cap during the use of the cap removal device 100. The circumference of the honed tube 20 is larger than the circumference of the cap remover 10. The diameter of the hone tube 20 is larger than the diameter of the cap remover 10. When the implemented the honed tube 20 surrounds the circumferential perimeter of the cap remover 10

It should be understood that while the honed tube 20 is described above as having the aforementioned dimensions, the dimensions implemented in the honed tube 20 may vary depending on the nature of the end cap that is to be removed and the cap remover 10 that is being implemented, i.e., larger end caps may have cap removers and cores having different sizes, while smaller end caps may use smaller dimensioned cap removers and cores.

Figure 7:
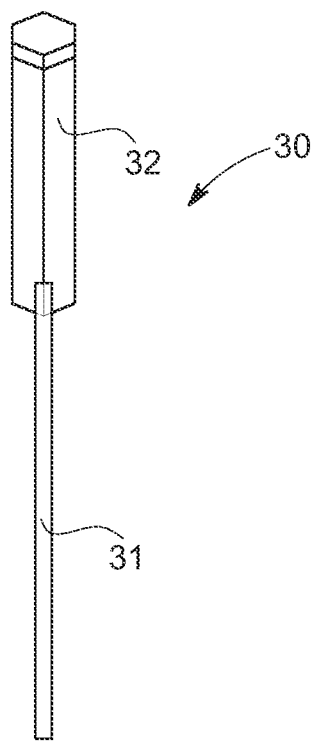
FIG. 7 is a view of a puller handle for the cap removal device.
Figure 8:
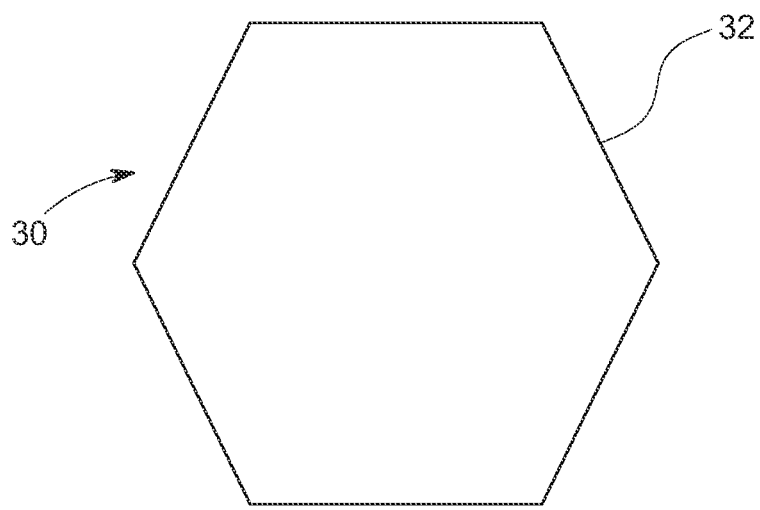
FIG. 8 is a top down view of the puller handle for the cap removal device.

Referring to FIGS. 7-8, the puller handle 30 is a ¾-inch hexagonal shaped elongated rod 31 made of 3 and ¾-inch-long carbon steel threaded at the bottom at a depth of ¾ inch for a 10 mm thread pitch. The 8-inch threaded rod 31 forming the puller handle 30 is screwed into the hexagonal shaped handle 32 of the puller handle 30 and is secured with a lock nut. In an embodiment the puller handle if formed as one integrated piece with the rod 31 and the handle being integrated together.

In an embodiment, a pentagonal shaped handle is used. In an embodiment a square shaped handle is used. In an embodiment, a rectangular shaped handle is used. In an embodiment, a handle commensurate with a tool adapted to provide leverage in the removal of the end cap is used.

In an embodiment, the cap removal device may be used in other industries that have a need to remove end caps from pressure vessels, such as in some medical fields, etc.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A cap removal system for removing end caps from reverse osmosis pressure vessels, the system comprising:
   a reverse osmosis pressure vessel;
   a cap remover screwed to an end cap of the reverse osmosis pressure vessel through at least two screw holes;
   a honed tube having an inset area adapted to be secured to the end cap of the reverse osmosis pressure vessel, the honed tube adapted to stabilize the cap removal device when removing the end cap from the reverse osmosis pressure vessel, wherein the honed tube has a larger circumference than the cap remover, wherein the honed tube has a first end and a second end the second end has larger opening than the first end; and
   a puller handle adapted to be secured to the cap remover, wherein movement of the puller handle removes the end cap from the reverse osmosis pressure vessel.

2. The system of claim 1, wherein the cap remover is adapted to be secured to the end cap with screws.

3. The system of claim 1, wherein the honed tube is cylindrically shaped.

4. The system of claim 1, wherein the puller handle is secured by being threaded into the cap remover.

5. The system of claim 1, wherein a top portion of the puller handle is hexagonal shaped.

6. The system of claim 1, the cap remover has four screw holes equidistantly spaced around the cap remover.

7. The system of claim 1, wherein the stabilization by the honed tube is adapted to prevent cross-threading during removal of the end cap from the vessel.

8. A method of removing an end cap from a reverse osmosis pressure device, the method comprising:
   securing a cap remover to the end cap of the reverse osmosis pressure vessel;
   securing a honed tube to the cap remover and the end cap of the pressure vessel;
   stabilizing the cap remover with the honed tube;
   securing the puller handle to the cap remover; and
   removing the end cap from the reverse osmosis pressure vessel via movement of the puller handle.

9. The method of claim 8, wherein the honed tube is cylindrically shaped.

10. The method of claim 8, wherein the puller handle is secured by being threaded into the cap remover.

11. The method of claim 8, wherein a top portion of the puller handle is hexagonal shaped.

12. The method of claim 8, wherein cross-threading is prevented during removal of the end cap from the vessel.

13. A cap removal device for removing end caps from a reverse osmosis pressure vessel, the device comprising: a cap remover adapted to be secured to an end cap of a reverse osmosis pressure vessel;
   a honed tube adapted to be secured to the end cap and adapted to stabilize the cap removal device when removing the end cap from reverse osmosis pressure vessel, wherein the honed tube has a larger circumference than the cap remover;
   a puller handle adapted to be secured to the cap remover, wherein movement of the puller handle removes the end cap from the reverse osmosis pressure vessel; and
   wherein the stabilization by the honed tube is adapted to prevent cross-threading during removal of the end cap from the vessel.

* * * * *